(No Model.)
A. RAST.
TUBE CLEANER.
No. 386,848.   Patented July 31, 1888.
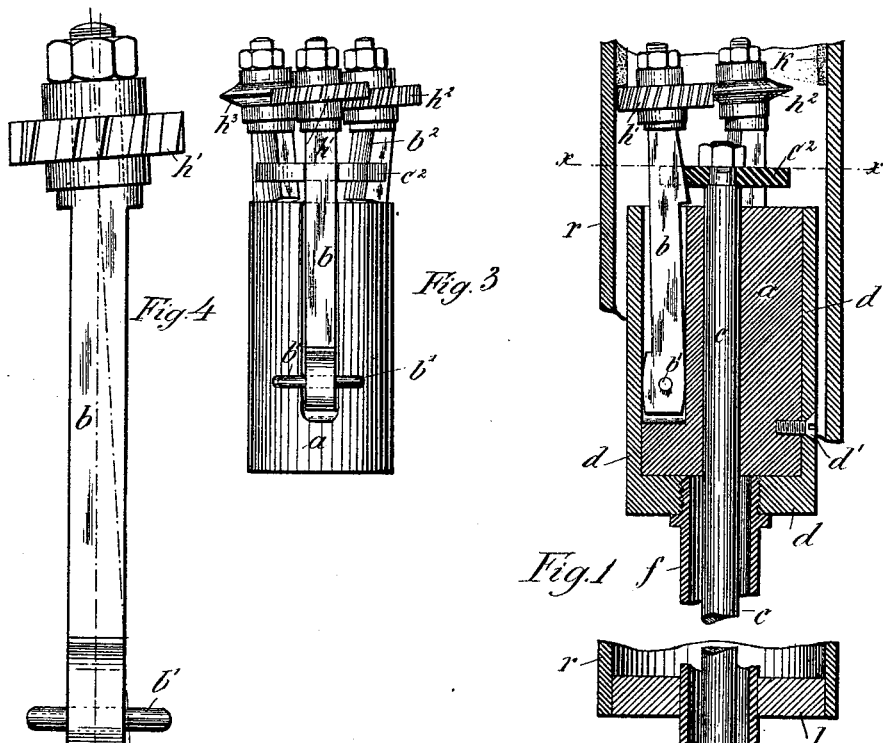
Witnesses:
W. Theodrovic
H. Kraus
Inventor:
August Rast
By
Attorney:

UNITED STATES PATENT OFFICE.

AUGUST RAST, OF OTTAKRING, NEAR VIENNA, AUSTRIA-HUNGARY.

TUBE-CLEANER.

SPECIFICATION forming part of Letters Patent No. 386,848, dated July 31, 1888.

Application filed December 27, 1887. Serial No. 259,268. (No model.)

*To all whom it may concern:*

Be it known that I, AUGUST RAST, a subject of the Emperor of Austria-Hungary, residing at Ottakring, near Vienna, Austria-Hungary, have invented a new and useful Apparatus for Removing Boiler-Scale from Boiler-Tubes, of which the following is a specification.

My invention relates to improvements in tube-cleaners; and it consists, essentially, in removing the scale by the co-operation of a plain revolving cutter and of serrated revolving cutters. Owing to the inclined position of the cutters with relation to the center of the rotatable head that carries them, the revolution of the head in one direction will draw the device into the boiler-tubes, and the reverse revolution of the head will move it in the reverse direction, so that it is quite unnecessary to press forward the apparatus while rotating it, so that the workman has nothing to do but to rotate the crank applied to the apparatus. As there is no great sliding friction, the cutters rotating round their own axes, the force to be employed is greatly diminished, and also the wear of the cutters is so trifling that it is possible to remove the scale of a great many tubes without being necessary to grind the cutters.

In the annexed drawings, Figure 1 represents a longitudinal section (partly broken) of the apparatus. Fig. 2 is partly a cross section on the line $x\ x$ of Fig. 1, partly a front view of the same. Fig. 3 shows a side view of the head or socket carrying the cutters, (the sleeve of the same being removed.) Fig. 4 represents on a larger scale an arm with its serrated revolving cutter to show the inclination of the same toward the axis of the arm.

The head or body carrying the tools is marked by the letter $a$. The same is provided with several longitudinal slots, as shown, that receive the arms $b$, and with transverse slots that receive pins $b'$ in the ends of arms $b$, which serve as pivots for said arms, the arms and pins being retained in place by sleeve $d$.

The fore parts of the arms $b$ end in gudgeons which carry the cutters. These gudgeons are inclined toward the center line of the arm $b$, as shown in Fig. 4, so that the cutters occupy an oblique position, owing to which the revolution of the head in one direction will draw the device into the boiler-tubes, and the reverse revolution of the head will move it in the reverse direction. Through the center of the head $a$ passes a rod, $c$, which is threaded at its outer end and may be adjusted by means of a nut, $c'$. On its fore end this rod $c$ carries a disk, $c^2$, provided with grooves or recesses, in which lie the arms $b$, with their inclined faces $b^2$. (See Fig. 1.)

As may be seen, the arms $b$ may be diverged or distanced from each other by adjusting the rod $c$ by means of the nut $c'$ so that the cutters act on a larger circumference.

The head $a$ is put in a sleeve, $d$, and both the parts are connected by means of a screw-pin, $d'$. On the rear end of the sleeve $d$ is a tube, $f$, screwed in, on the free end of which may be mounted a crank, $g$, to rotate the tube $f$ and the coupled sleeve $d$, and by means of the latter the head $a$, which bears the tools. In the annexed drawings are shown three tools, $h'\ h^2\ h^3$, of which $h'\ h^2$ are serrated revolving cutters with inclined teeth, and $h^3$ is a plain revolving cutter.

Owing to the inclined position of the cutter-teeth the apparatus is prevented from sliding back as the oblique or inclined teeth engage on the scale. By the combined arrangement of the plain revolving cutter and the serrated revolving cutters a removing of the scale in small particles is effected. Notwithstanding a perfect cleaning of the tube is effected, the shell of the tube will not be injured.

In order to prevent the teeth of the second serrated revolving cutter entering the grooves or tracks made by the first serrated revolving cutter, the number of teeth (or pitch) of both cutters may be unequal.

$r$ is the tube to be cleaned with the scale $k$.

It is to be understood that the number of cutters may be varied; also, the teeth of the serrated revolving cutters may be straight instead of inclined, though the latter arrangement is to be preferred.

In order to center the tube $f$ of the apparatus, the same may be supported by a disk, $l$, (of wood, &c.,) said disk being put in the rear end of the tube to be cleaned.

Having fully described my invention, what I desire to claim and secure by Letters Patent is—

1. The combination, with the head $a$, of the arms $b$, carrying a plain revolving cutter, $h^3$, and serrated revolving cutters $h'\ h^2$, being inclined or oblique with relation to the center of the rotatable head that carries them, all constructed and arranged as and for the purposes set forth.

2. The combination, with the head $a$, of the arms $b$, carrying a plain revolving cutter, $h^3$, and serrated revolving cutters $h'\ h^2$, being inclined with relation to the center of the rotatable head that carries them, rod $c$, with nut $c'$, and disk $c^2$, all constructed and arranged as and for the purposes set forth.

3. The combination, with the head $a$, of the arms $b$, carrying a plain revolving cutter, $h^3$, and serrated revolving cutters $h'\ h^2$, being inclined with relation to the center of the rotatable head that carries them, sleeve $d$, rod $c$, with nut $c'$ and disk $c^2$, tube $f$, and crank $g$, all constructed and arranged as and for the purposes set forth.

In testimony whereof I have signed my name to this specification in the presence of two subscribing witnesses.

AUGUST RAST.

Witnesses:
 EDMUND JUSSEN,
 OTTO SCHIFFER.